United States Patent [19]

Mann

[11] 3,992,525

[45] Nov. 16, 1976

[54] ANTIBIOTIC

[75] Inventor: Elton W. Mann, Portales, N. Mex.

[73] Assignee: Research Corporation, New York, N.Y.

[22] Filed: Jan. 24, 1975

[21] Appl. No.: 543,980

Related U.S. Application Data

[60] Division of Ser. No. 367,749, June 4, 1973, which is a division of Ser. No. 121,199, March 4, 1971, Pat. No. 3,819,829, which is a division of Ser. No. 672,462, Oct. 13, 1967, Pat. No. 3,617,448, which is a continuation-in-part of Ser. No. 334,907, Dec. 31, 1963, abandoned.

[52] U.S. Cl. .............................................. 424/115

[51] Int. Cl.$^2$.......................................... A61K 35/74

[58] Field of Search ..................................... 424/115

[56] References Cited
UNITED STATES PATENTS 3,819,829   6/1974   Mann .................................. 424/93

*Primary Examiner*—Jerome D. Goldberg
*Attorney, Agent, or Firm*—Dennis P. Clarke

[57] ABSTRACT

A water-soluble antibiotic substance having anti-fungal, anti-viral, anti-nematodal and anti-bacterial properties is elaborated by the organism *Bacillus uniflagellatus*, sp. n., (ATCC 15134).

4 Claims, No Drawings

ANTIBIOTIC

This is a division of co-pending application Ser. No. 367,749, filed June 4, 1973 which is a divisional of application Ser. No. 121,199, filed March 4, 1971, now U.S. Pat. No. 3,819,829, issued June 25, 1974, which in turn is a division of Ser. No. 672,462, filed Oct. 3, 1967 now U.S. Pat. No. 3,617,448, which is a continuation-in-part of my application Ser. No. 334,907, filed Dec. 31, 1963 now abandoned.

This invention relates to a novel microorganism-elaborated antibiotic substance and to methods of producing and utilizing this substance.

The microorganism employed in the practice of my invention is designated *Bacillus uniflagellatus*, sp. n. Unusual features of the organism include its motility, by means of a single polar flagellum, and the production of endospores. Other morphological and physiological characteristics of the organism are as follows:

Vegetative rods. - $0.8\mu$ to $1.0\mu$ by $1.6\mu$ to $2.2\mu$; chains long and sluggishly motile in broth cultures, breaking up to highly motile pairs and to single cells prior to spore formation; Gram - positive; capsules slight if any.

Sporangia. - Little if any swelling. Bipolar staining.

Spores. - $0.8\mu$ to $1.0\mu$ by $1.0\mu$ to $1.8\mu$; oval; central thin walled; number over time increases with temperature to 40° C.

Temperature. - Minimum 18° C; maximum 48° C; optimum 31° to 37° C.

Nutrient broth. - Clear with heavy pellicle.

NaCl broth. - Good growth to 5%; increasing inhibition to 12%. No growth above 12%.

Hydrolysis of starch. - Positive.
Hydrolysis of casein. - Positive.
Hydrolysis of gelatin. - Positive.
Anarobic growth. - Negative.
Glucose (acid). - Positive.
Arabinose (acid). - Negative.
Mannitol (acid). - Negative.
Indol. - Negative.
V-P. - Negative.
Nitrate reduction. - Positive.
Urease. - Negative.
L.V. - Negative.
Citrate. - Positive, except when transfers were made from colonies on blood agar. No growth occurred upon transfer from blood agar.

A culture of the organism is on deposit with the American Type Culture Collection (ATCC No. 15,134).

The antibiotic substance of the present invention is elaborated when *B. uniflagellatus* is grown in a nutrient medium containing assimilable carbon and nitrogen at a temperature in the range of 26° to 38° C. The elaboration of antibiotic substance is promoted by growing the organism in carrot extract, tryptose-carrot or glucose-casamino acid media at about 30° C. Appreciable amounts of antibiotic substance are produced within three days; maximum or optimum yields are obtained within five to ten days.

The culture medium in which the organism has been or is being grown contains the antibiotic substance and can be used as such or after clarification and concentration by evaporation. In earlier preparations, the antibiotic substance was isolated by autoclaving the culture to destroy the organism, separating the liquid from the solid matter present by centrifugation and precipitating the antibiotic substance from solution by adding 30% aqueous potassium hydroxide or a water-miscible organic solvent such as acetone to the clarified liquid. Preferably, the clarified liquid is continuously extracted with a warm organic solvent such as diethyl ether. Autoclaving and centrifugation may be eliminated by boiling the concentrated culture for several minutes with about 1½ volumes of isopropyl alcohol; this treatment destroys the bacterial cells and coagulates the solid matter for ready removal by filtration. The antibiotic substance is obtained on evaporation of water and/or the extracting solvent.

The antibiotic substance is assayed against *Rhizoctonia solani*. Petri dishes containing 15 ml of glucose yeast extract agar are prepared. Colonies of *R. solani* are transferred to the center of each dish and incubated at room temperature for one day. A line is drawn on the bottom of each dish at the advancing edge of the mycelium and four radial lines are drawn to the perimeter of the dish. The assay is made by applying 0.05 ml of a test solution (10% aqueous solution of the antibiotic substance) at the intersection of the radial lines with the edge of the mycellium. The diameters of the zones of inhibition are measured after 24 hours further incubation.

A suitable carrot medium for the practice of my invention is made by cooking about 50g of carrots, 5g of tryptose and 1g of yeast extract in 500 ml of distilled water for 15 minutes at 15 psi. The tryptose may be omitted and peptone and/or various sugars may be added. The medium is sterilized by autoclaving for 20 minutes at 15 psi.

Casamino acid media are made by preparing a solution containing the equivalent of 10–30 g liter of casamino acid and 30 g per liter of glucose, and 2 ml of a micronutrient solution containing ferric nitrate, zinc sulfate and manganous sulfate. The media are sterilized by autoclaving as above.

In a preferred embodiment of my invention, a flask of nutrient medium is inoculated with *B. uniflagellatus* as a 5-day culture from a test tube slant (glucose yeast extract agar) suspended in 2 ml of water. The inoculated medium is incubated at about 27°–30° C 7 to 9 days. The clarified culture medium is continuously extracted for 3 days with ether using a Kutscher-Steudal extractor. (Weisburger, "Techniques of Organic Chemistry", Vol. 3, Part I, "Separation and Purification" at page 230). About 5 ml of crude antibiotic substance is obtained per liter of culture medium extracted.

The antibiotic substance of the present invention is a straw-colored, water-soluble, heat-stable liquid. The substance does not appear to be a polypeptide or a polyene. Since it has not yet been chemically characterized, antibiotic production has been studied by bioassay against *R. solani* using the method described above. The measured diameter of the zone of inhibition obtained averages 30 mm.

The antibiotic substance of the present invention exhibits a wide spectrum of anti-fungal activity. Typical inhibition zone diameters established against other genera of fungi using the assay method are as follows:

| Fungal organism | Zone of inhibition |
| --- | --- |
| Helminthosporium | 35 mm |
| Phycomyces | 25 mm |
| Fusarium | 20 mm |

-continued

| Fungal organism | Zone of inhibition |
|---|---|
| Phytopthora | 8 mm |
| Rhizopus | 5 mm |

The antibiotic substance, at a concentration of 500 parts per million, effectively inhibits *Fusarium oxysporum lycopersica* on agar plates and shows an LD 95% against spores of this organism by the hanging drop method at a concentration of 100 parts per million.

Bacterial organisms against which the substance has been found to be effective are *Staphylococcus aureus*, *Proteus*, *Agrobacterium radiobacter*, *Micrococcus roseus*, *Bacillus terminales*, *Vibrio* spp, *Salmonella* D, *Klebsiella pneumoniae*, *Bacillus mycoides*, *Salmonella cholera suis*, *Shigella* spp, *Bacillus circulans*, *Norcardia* spp, *Corynebacter insidium*, *Escherichia freundii*, *Bacillus pumilus*, *Mycobacterium* spp, and *Flavobacter brevis*.

Fungal and viral diseases of plants can be controlled by applying the antibiotic substance to the plants directly, by treating plant seeds with a viable culture of *B. uniflagellatus* or otherwise growing plants in the presence of *B. uniflagellatus*. The organism produces the antibiotic substance which translocates through the plant and is effective against infestion of both the root and aerial portions of the plants treated. At the same time, the antibiotic substance is not toxic to the plant undergoing treatment.

The method of the present invention is effective in controlling fusarium wilt and damping off in plants such as cotton and peanuts. The method is also effective in controlling black-hull disease, a fungus-induced disease of peanuts. For example, cotton seeds and peanut seeds were soaked with a viable culture of *B. uniflagellatus* just prior to planting. A control group was soaked with distilled water. The rate of survival of plants sprouting from the treated seeds was appreciably higher than those sprouting from the untreated controls in both series of experiments.

In tests against nematodes the soil, a pot containing ten 5-inch tomato plants, was inoculated with 2000 root knot nematodes (Meloidogyne). The leaves of the plants were sprayed with a 1 to 400 aqueous solution of the antibiotic substance at five day intervals for 3 weeks. At that time no galls could be found on the plants or their roots and no nematodes could be found in a blenderized dispersion of the roots or in the soil, thus indicating translocation of the active substance in the plants. Other tests have shown the antibiotic substance to be effective at a concentration of 1 to 5000 against the nematodes *Panagrellus silusiae* and *Turbatrix aceti*.

The antibiotic substance of the present invention is particularly useful in the treatment of virus diseases of plants. The substance may be applied onto the plants or to the soil in which the plants are being grown. In the latter case, the antibiotic is absorbed via the plants' root systems and translocated to the afflicted or viral-disease susceptible areas.

The following experiments were made directed to the management of tobacco mosaic virus disease in *Nicotiana tabacum* (Xanthi):

Thirty Xanthi tobacco plants grown in individual pots were prepared by removing apical buds, immature and senescent leaves, and permitting five mature leaves to remain per plant. A 4% aqueous solution of the antibiotic substance was added to 15 of the pots (20 ml per pot); the other 15 were kept as controls. All plants were inoculated with virus six hours after treatment by abrasion of the leaves with a buffered virus solution. The resultant lesions on each leaf were counted five days later. The control plants had an average of 181 lesions per plant. The treated plants had an average of 54 lesions per plant; there was a greater reduction in the number of lesions in the lower leaves than in the upper leaves.

Culture medium containing *B. uniflagellatus* was added to 3 groups of 4 pots each (100 ml per pot); 4 pots were kept as controls. The plants were inoculated with virus six days after the last treatment and the resultant lesions counted seven days later. The control plants had an average of 155 lesions per plants. The treated plants had an average of 100, 89 and 91 lesion per plant. Bioassay experiments against *R. solani* showed the presence of antibiotic substance in the tobacco plants as well as the treated soil.

Other variations in the above-illustrated methods falling within the scope of my invention will be apparent to those skilled in the art. My invention is as claimed.

I claim:

1. A method for controlling fungal diseases of plants which comprises applying to plants, their seeds or soils containing said plants or seeds an anti-fungal effective amount of the antibiotic substance prepared by the process of cultivating *Bacillus uniflagellatus*, sp.n. (ATCC 15134) in a sterile liquid nutrient medium containing sources of assimilable carbon and nitrogen until a sufficient amount of the antibiotic has been imparted to the medium.

2. A method according to claim 1 wherein the antibiotic substance is applied directly to the plants or seeds.

3. A method according to claim 1 wherein the antibiotic substance is applied to the soil containing the plants or seeds.

4. A method according to claim 1 wherein the antibiotic substance is generated in the soil containing the plants or seeds.

* * * * *